US008112243B2

(12) United States Patent
Meadows et al.

(10) Patent No.: US 8,112,243 B2
(45) Date of Patent: Feb. 7, 2012

(54) FORWARD VOLTAGE SHORT-PULSE TECHNIQUE FOR MEASURING HIGH POWER LASER ARRAY JUNCTION TEMPERTURE

(75) Inventors: Byron L. Meadows, Hampton, VA (US); Frazin Amzajerdian, Yorktown, VA (US); Bruce W. Barnes, Yorktown, VA (US); Nathaniel R. Baker, Hampton, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 932 days.

(21) Appl. No.: 12/118,172

(22) Filed: May 9, 2008

(65) Prior Publication Data

US 2008/0319690 A1   Dec. 25, 2008

Related U.S. Application Data

(60) Provisional application No. 60/945,163, filed on Jun. 20, 2007.

(51) Int. Cl.
*G01K 7/01* (2006.01)
(52) U.S. Cl. ........................................................ 702/130
(58) Field of Classification Search .................. 702/57, 702/58, 64, 65, 79, 90, 99, 130, 183, 185; 324/754.19; 327/538
See application file for complete search history.

(56) References Cited

U.S. PATENT DOCUMENTS

| | | | | |
|---|---|---|---|---|
| 3,303,432 A | * | 2/1967 | Garfinkel et al. | |
| 3,725,148 A | * | 4/1973 | Kendall | |
| 3,986,117 A | * | 10/1976 | Fry et al. | |
| 4,309,671 A | * | 1/1982 | Malyon | |
| 4,315,225 A | * | 2/1982 | Allen, Jr. et al. | |
| 4,393,393 A | * | 7/1983 | Allen, Jr. et al. | |
| 4,489,477 A | * | 12/1984 | Chik et al. | |
| 4,955,029 A | * | 9/1990 | Lecoy et al. | |
| 5,140,605 A | * | 8/1992 | Paoli et al. | |
| 5,200,972 A | * | 4/1993 | Scheps | |
| 5,285,467 A | * | 2/1994 | Scheps | |
| 5,404,367 A | * | 4/1995 | AuYeung et al. | |
| 5,406,172 A | * | 4/1995 | Bennett | |
| 5,515,391 A | * | 5/1996 | Endriz | |
| 5,604,757 A | * | 2/1997 | Liang et al. | |
| 5,615,224 A | * | 3/1997 | Cohen | |
| 5,913,108 A | | 6/1999 | Stephens et al. | |

(Continued)

FOREIGN PATENT DOCUMENTS

WO  WO 2005/05079248   *   9/2005

*Primary Examiner* — Mohamed Charioui
(74) *Attorney, Agent, or Firm* — Andrea Z. Warmbier; Robin W. Edwards

(57) ABSTRACT

The present invention relates to a method of measuring the temperature of the P-N junction within the light-emitting region of a quasi-continuous-wave or pulsed semiconductor laser diode device. A series of relatively short and low current monitor pulses are applied to the laser diode in the period between the main drive current pulses necessary to cause the semiconductor to lase. At the sufficiently low current level of the monitor pulses, the laser diode device does not lase and behaves similar to an electronic diode. The voltage across the laser diode resulting from each of these low current monitor pulses is measured with a high degree of precision. The junction temperature is then determined from the measured junction voltage using their known linear relationship.

12 Claims, 3 Drawing Sheets

U.S. PATENT DOCUMENTS

| | | |
|---|---|---|
| 6,553,044 B1 | 4/2003 | Eden |
| 7,060,515 B2 | 6/2006 | Stephens |
| 2005/0169327 A1* | 8/2005 | Eden et al. |
| 2007/0051708 A1* | 3/2007 | Talwar et al. |
| 2007/0197885 A1* | 8/2007 | Mah et al. ..................... 600/310 |
| 2007/0210854 A1* | 9/2007 | Mangano ..................... 327/538 |

* cited by examiner

FORWARD VOLTAGE SHORT-PULSE TECHNIQUE FOR MEASURING HIGH POWER LASER ARRAY JUNCTION TEMPERTURE

ORIGIN OF THE INVENTION

This invention was made in part by employees of the United States Government and may be manufactured and used by or for the Government of the United States of America for governmental purposes without the payment of any royalties thereon or therefor. Pursuant to 35 U.S.C. §119, the benefit of priority from provisional application 60/945, 163, with a filing date of Jun. 20, 2007, is claimed for this non-provisional application.

FIELD OF THE INVENTION

The present invention generally relates to laser diodes and, more particularly, relates to systems and methods for measuring the junction temperature of quasi-continuous-wave and pulsed laser diodes.

BACKGROUND OF THE INVENTION

Most moderate to high power solid state lasers, such as those used for space-borne laser remote sensing systems, require high-power pulsed or quasi-continuous-wave ("Quasi-CW" or "QCW") laser diodes as their optical pump source. One or more laser diodes may be used. If more than one laser diode is used, the laser diodes may be structured in a laser diode bar and laser diode bars can be stacked to form a two dimensional array, referred to as Laser Diode Array (LDA). For purposes of this application, the terms laser diode and laser diode array will be used interchangeably. LDA performance and reliability directly determine the effective system operational lifetime, as the laser transmitter operational lifetime is the instrument's lifetime, for without the transmitted beam, there is no reflected signal to record or analyze. For example, statistical analysis of lifecycle testing of an LDA used for an Earth-orbiting two-micron LIDAR (light detection and ranging) instrument indicates that there is a 1% probability that such an LDA will fail before it accumulates 30 million shots, a 50% probability of failing before reaching 120 million shots, and a 99.9% probability of failing before reaching 220 million shots. This lifetime is inadequate for such an Earth-orbiting LIDAR instrument which will require a lifetime of at least one billion shots. As for nearly all electronic devices, the higher the device's temperature, the shorter the lifetime.

In order to minimize the risk to such missions and other semiconductor laser based instruments, there is a need to better understand and design a means to reduce the probability of failure of the LDAs. The production of the useful radiation is not 100% efficient (typically 50%) and the laser diodes produce heat, which causes an overall rise in their temperature and requires some means to keep the diodes from overheating which could result in catastrophic failure. Compared with their low-power CW counterparts, these LDAs suffer from shorter lifetimes and are more susceptible to degradation and premature failure. The primary factor in their rapid degradation and failure is the excessive localized heating and substantial pulse-to-pulse thermal cycling of the laser active regions when such devices are operated at high currents over a relatively long pulse duration (beyond 0.2 milliseconds), even at relatively low pulse repetition frequencies. For example, the thermally-induced stresses are particularly significant when the required pump pulsewidth is increased from 200 microseconds (required for neodymium-based lasers) to at least one millisecond (required for thulium and holmium lasers). If the laser diode's junction temperature can be monitored during operation (i.e., while the laser is being operated, but during the intervals between drive pulses and not while the drive pulses are occurring), this information would be useful in determining overall laser diode health, expected lifetime, and problems with the instrument's cooling system. Detection of excessive temperature rise during the instrument operation can also allow for preventive measures to prolong the LDA lifetime, such as reducing drive current or pulse duration and bypassing defective laser diode bars or arrays. Additionally, this invention provides a reliable and accurate means for screening and evaluating LDAs prior to utilization in an instrument.

Until now there have been only indirect or relative means of measuring the junction temperature during a pulse, such as measuring the change in the optical power, peak wavelength or a shift in the threshold current necessary to cause the medium to lase. Other means are either too slow (such as infrared photography) or too large (such as thermocouples or thermistors) to accurately and effectively measure the temperature of a junction (which is only several microns thick). None of these techniques are practical for real time monitoring of the LDA junction temperature during the instrument operation as they either intrude into the optical path or require extensive data processing.

The ability to measure the junction temperature of high power LDAs is crucial to determining the reliability and lifetime of these devices and monitoring their operation. Junction temperature measurement is also vital to being able to quantify any improvements that are made in manufacturing processes, device materials, and laser architecture (especially that of the laser cooling systems).

SUMMARY OF THE INVENTION

The object of the present invention is to overcome the aforementioned drawbacks of current junction temperature measurement techniques and to provide an accurate, reliable, and direct system and method of measuring the junction temperature of a laser diode. The present invention relates to a system and method of measuring the temperature of the P-N junction within the light-emitting region of a quasi-continuous-wave or pulsed laser diode device. A series of relatively short and low current monitor pulses are applied to the laser diode in the period between the main drive current pulses necessary to cause the semiconductor to lase. At the sufficiently low current level of the monitor pulses, the laser diode device does not lase and behaves similar to an electronic diode. The voltage across the laser diode resulting from each of these low current monitor pulses is measured with a high degree of precision. The junction temperature is then determined from the measured junction voltage using their known linear relationship.

In one embodiment of the invention, a system for determining a junction temperature of a quasi-continuous-wave or pulsed laser diode comprises a high current driver, a low current driver, a voltage measuring device, and a processing element. The high current driver is configured to provide high current drive pulses having an amperage selected to cause the laser diode to lase. The low current driver is connected in parallel with the high current driver and configured to provide low current monitor pulses between the pulses of the high current drive pulses. The low current monitor pulses have an amperage selected to not cause the laser diode to lase, further selected to cause the laser diode to behave like an electronic diode, and further selected to cause negligible self-heating of the laser diode. The voltage measuring device is configured to measure the voltage across the laser diode during provision of the low current monitor pulses. The processing element is configured to calculate the junction temperature of the laser diode based on the measured voltage.

The system may further comprise a delay generator configured to delay a start of the low current monitor pulses for a predetermined time after each pulse of the high current drive pulses. The processing element may be further configured to adjust a laser diode thermal management system based on the calculated junction temperature. The processing element may also be configured to determine if the junction temperature exceeds a predetermined maximum temperature and to cause the high current driver to decrease power, pulsewidth, or frequency of the high current drive pulses in order to achieve a desired decrease in the junction temperature.

The processing element may calculate the junction temperature of the laser diode using equation $I=I_0(\exp(qV/nkT)-1)$ in which I is the pulsed low current, $I_0$ is a saturation current of the laser diode, q is an electrical charge of an electron, V is the measured voltage, n is an emission coefficient, k is Boltzmann's constant, and T is the junction temperature of the laser diode. Alternatively, the processing element may calculate the junction temperature of the laser diode using a predetermined linear equation which has been determined by measuring the voltage across the laser diode over a range of low current monitor pulses having different amperages and pulsewidths and over a range of different laser diode temperatures.

In addition to the system for determining a junction temperature of a quasi-continuous-wave or pulsed laser diode as described above, other aspects of the present invention are directed to corresponding methods for determining a junction temperature of a quasi-continuous-wave or pulsed laser diode.

BRIEF DESCRIPTION OF THE DRAWINGS

Figure 1:
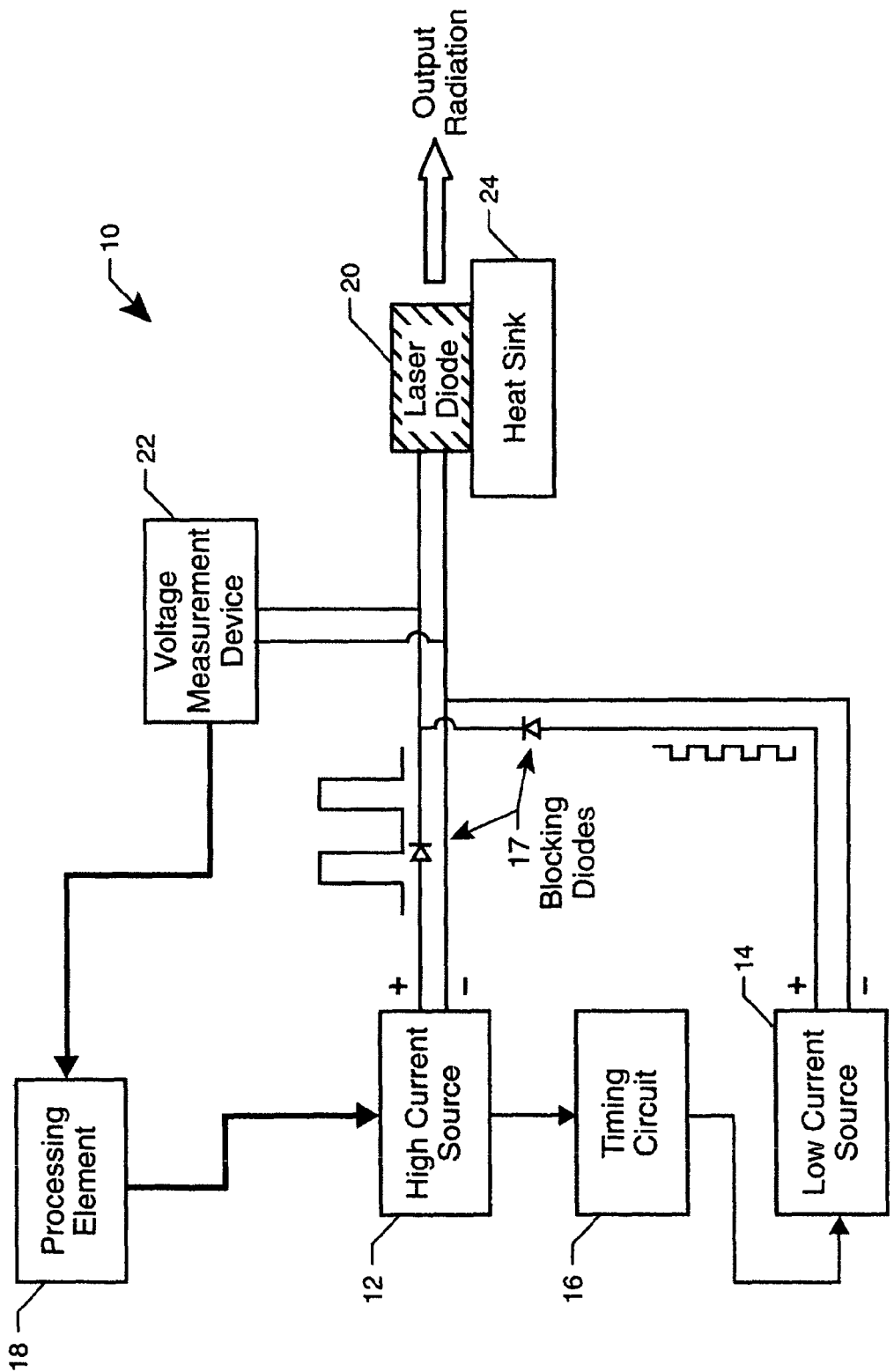
Figure 2:
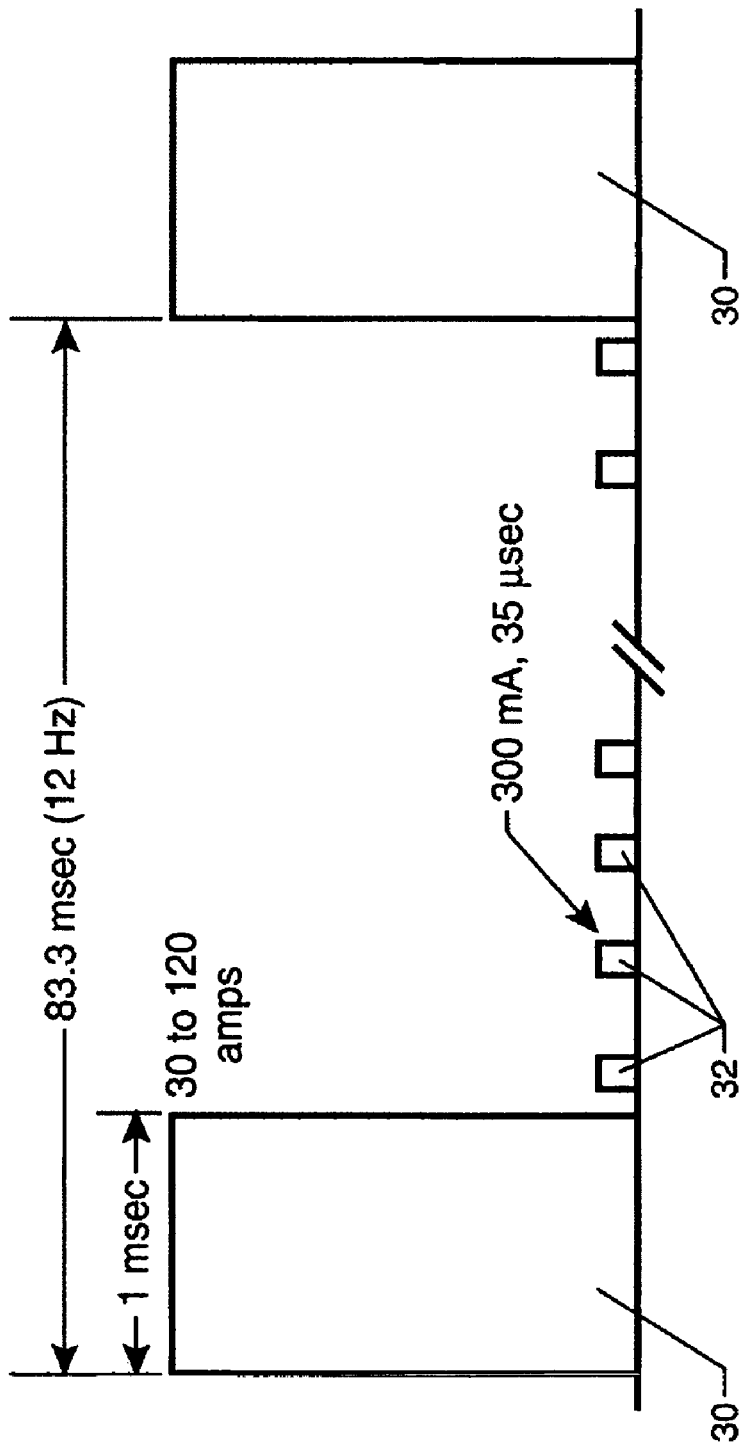
Figure 3:
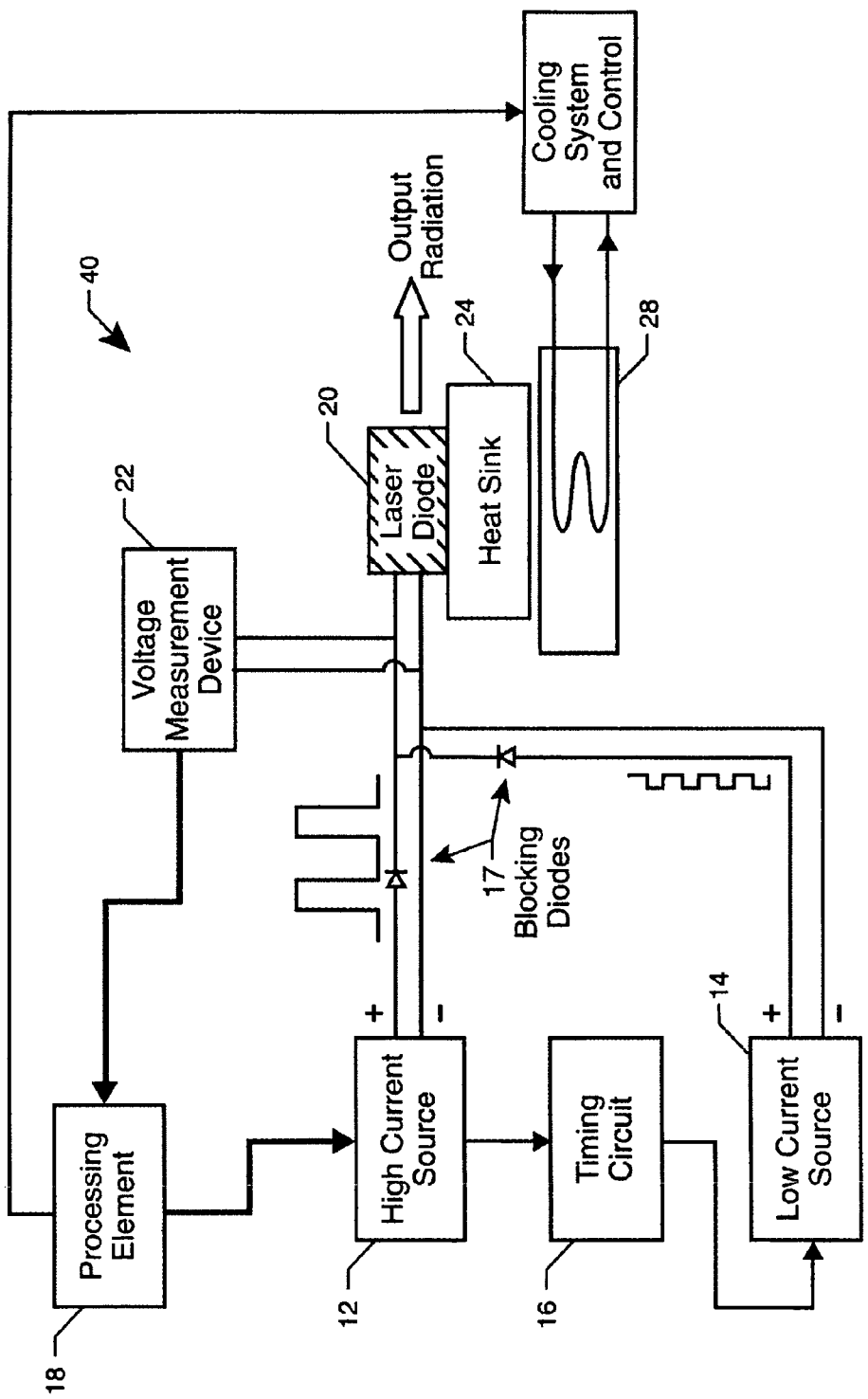

Having thus described the invention in general terms, reference will now be made to the accompanying drawings, which are not necessarily drawn to scale, and wherein:

FIG. 1 is a schematic block diagram of a system for determining a junction temperature of a quasi-continuous-wave or pulsed laser diode, in accordance with one embodiment of the invention;

FIG. 2 illustrates the duration and amperage of the pulsed high and low currents, in accordance with one specific embodiment of the invention used in conjunction with a high power laser; and FIG. 3 is a schematic block diagram of a system for determining a junction temperature of a quasi-continuous-wave or pulsed laser diode, in accordance with an alternative embodiment of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention comprise a forward voltage measurement technique that may be termed a "Forward Voltage-Short Pulse" (FV-SP) technique. The FV-SP technique is particularly useful in providing the necessary data for a meaningful trade analysis leading to maximum attainable lifetime and reliability of LDAs. Such a trade analysis can encompass the LDA design and operational parameters described below, which facilitates quantitative comparison between vendors and packages as well as screening of devices within a given fabrication run.

It is well known that a laser diode can operate in one of three regimes. At low current, the laser diode produces no light but has the electrical characteristics of a classic electronic diode. At slightly higher applied currents, the laser diode produces light, which is not coherent and resembles light from a light emitting diode (LED). At high current, the laser diode produces large amounts of coherent or partially coherent light (i.e., the laser diode lases), which is its intended purpose. The FV-SP measurement utilizes the diode characteristics of the LDA at low current to measure its junction temperature. In this technique, a series of relatively short and low current pulses (relative to the LDA drive current) are applied to a laser diode between pulses of the drive current and the resultant voltage across the LDA is measured with a high degree of precision. These low current pulses may be termed "monitor currents" or "monitor pulses." The measured voltage across the array is used to determine the junction temperature by the use of a linear equation. The linear equation is determined by, using experience and familiarity with laser diode arrays, selecting several different test currents (differing in amperage and/or pulsewidth) and measuring the voltage across the laser diode that is being maintained at one temperature. The test is repeated at several different laser diode temperatures over a broad temperature range. The laser diode temperatures can be varied by changing the temperature of the heat sink attached to the laser diode, amongst other means. The test current that produces the most linear and repeatable data during testing is used as the monitor current during actual operation of the laser diode (as discussed above, "during actual operation" means while the laser is being operated, but during the intervals between drive pulses and not while the drive pulses are occurring), and the linear equation that describes the voltage/temperature relationship for that test current is used to determine the junction temperature during actual operation. As long as the same monitor current is used (i.e., the same as the test current), this linear equation can be used to determine the junction temperature of the laser diode under any conditions of drive current—regardless of amperage, pulse repetition rate, or pulsewidth. Alternatively, the measured voltage drop across the array is related to the junction temperature through the diode I-V equation (described in more detail below), although this method is more time-consuming and resource-intensive.

This technique utilizes the fact that all diodes have a very linear relationship between voltage and temperature in the low voltage/current region. This technique allows operation of the laser and probing of the LDA during operation to determine the junction temperature directly. This technique fills the need for an accurate, reliable, and direct method for the measurement of junction temperatures and thermal impedance on high power, laser diode arrays. Advancements in laser diode array packaging technology benefit greatly from thermal impedance measurements. In other words, this novel measurement technique enables: (1) accurate evaluation of different LDAs and identification of the devices with the longest expected lifetimes; (2) pre-screening of the selected LDAs prior to integration into a laser system; (3) definition of the optimal operating parameters (drive current, pulse duration, pulse repetition rate, and operating sink temperature) which yield the maximum lifetime; and (4) monitoring of the operation of the LDAs as an integrated component of the laser system allowing for precautionary actions (i.e., to avoid potential failure) in an automated fashion.

The FV-SP system and method for determining the laser diode's junction temperature is applicable to all quasi-continuous-wave (QCW) or pulsed laser diodes, regardless of pulse width or application. While the systems and method of the present invention are applicable to both QCW and pulsed laser diodes, embodiments of the invention are described herein in conjunction with QCW laser diodes only for simplicity. The QCW laser diodes could be in the form of a single element discrete device, a laser bar comprising many lasing elements, or a stacked array of bars.

Embodiments of the invention provide a system and method that allows the laser diode to continue normal operation without any interference. No sensors or detectors are put in the laser's beam path to measure wavelength or power. No detectors or sensors are attached to the laser diode. All measurements with the FV-SP technique are made when the laser diode is 'off', that is, during the period between the laser diode's drive pulses.

There are many advantages to knowing the laser diode's junction temperature using embodiments of the invention:
1. High junction temperatures are indicative of a diode that will rapidly age, as is true of all electronic devices running at high temperatures (due to the Arrhenius relation). Furthermore, due to the differences in the coefficients of thermal expansion of the various materials used to construct a laser diode, high temperatures can cause higher stresses in the materials, which could lead to cracking or debonding of its parts.
2. Rising temperatures over time indicates a problem within the diode itself, or in the heat removal system (also referred to as the thermal management system) for the diode's waste heat.
3. Knowing the junction temperature allows for the application of an automated power supply control system, which monitors the diode laser operation and detects anomalies within the laser diode assembly or any irregularities or failure of the heat management system used with the laser diode. Once the anomalies are detected through the implementation of the FV-SP system and method, a number of actions can be taken to either prevent catastrophic failure of the laser diode, isolate the failure, or at the minimum inform the operator about the occurrence of the failure. Preventive measures for lowering the junction temperature upon the detection of anomalies could include reducing the applied drive current, the pulse duration, or pulse repetition rate. This is particularly important in remote applications where replacement of the laser diodes is cost-prohibitive or impossible (e.g., space satellites).
4. Laser diodes may be characterized or evaluated under the intended operational conditions or as an integrated component of a system since the junction temperature measurement does not intervene in the normal operation of the laser diode.
5. Embodiments of the invention provide a means for controlling and/or stabilizing the emitted wavelength of laser diodes. The wavelength and junction temperature relationship of laser diodes is well understood, and various methods for wavelength stabilization are available, although more complex than the present invention.

Referring now to FIG. 1, a schematic block diagram of a system 10 for determining a junction temperature of a laser diode 20 is illustrated, in accordance with one embodiment of the invention. As illustrated in FIG. 1, embodiments of the invention utilize two pulsed current drivers connected in parallel across the LDA 20, but isolated from each other by blocking diodes 17, to electrically pump and probe the LDA 20. The blocking diodes 17 prevent current flowing back into one of the current sources when the other source is operated. The first driver, a precision high current source 12, is used to pump the LDA 20 at some nominal current, pulse duration and repetition frequency which yields the laser output. This laser output from the LDA 20 may be used by itself or may be used to stimulate, or energize, solid state laser gain materials. The output from the high current source 12 may be termed a "high pulsed current," "high current drive pulses," or a "pump pulse."

The second driver, a precision low current source 14, is triggered by a timing circuit 16 within a predefined time from the end of the pump pulse. The output from the low current source 14 may be termed a "low pulsed current" or "low current monitor pulses." The high current source 12 operates as in a typical laser diode, but the timing circuit 16 directs the low current source 14 to produce a series of low current monitor pulses in the gap between the main drive current pulses. In essence, the timing circuit introduces a delay between each high current pulse and the first in each series of low current pulses. The amount of the initial delay depends on the pulsewidth and repetition rate of the drive current and will typically range from about 30 to about 70 microseconds. The delay allows for the dissipation of any transients which might interfere with the measurement. The amperage of the low current monitor pulses is selected to not cause the LDA 20 to lase or to cause significant self-heating of the LDA 20, and is also selected to cause the LDA 20 to behave like a classic electronic diode.

The timing circuit 16 may simply be a delay generator, which is commercially available from several sources. The low current source 14 is also commercially available. Both the low current source 14 and the delay generator may be stand-alone devices as shown in FIG. 1, or may be incorporated into the high current source 12.

Such low current pulses, due to their extremely low intensity, cause negligible heating of the LDA while still producing a voltage response from the device. The voltage across the LDA can be precisely measured, such as by voltage measurement device 22. Then, using the previously determined linear equation (described above) or the standard diode equation (described below), the LDA junction temperature can be calculated (such as by processing element 18). This is possible due to the very linear relationship between temperature and voltage of all diodes in the low current regime.

The processing element may calculate the junction temperature of the laser diode array using equation $I=I_0(\exp(qV/nkT)-1)$, in which I is the pulsed low current, $I_0$ is a saturation current of the LDA, q is an electrical charge of an electron, V is the measured voltage, n is an emission coefficient, k is Boltzmann's constant, and T is the junction temperature of the LDA.

The system and method of determining the laser diode junction temperature described above is applicable to all quasi-continuous-wave (QCW) and pulsed laser diodes. For example, the system and method may be used to determine the laser diode junction temperature of a high power semiconductor laser using an array of six 100 Watt diode bars. In such an application, the magnitude of the output from the high current driver will typically range from 30 to 120 amps, and will often be about 100 amps. The pulse duration of the pump pulse will typically be greater than about 0.2 milliseconds, and often be about one millisecond for two-micron Lidar instruments. The repetition frequency will typically be about 10-20 Hertz (Hz). In one specific embodiment of the invention for use with such a high power laser, the delay provided by the delay generator is initially about 50 microseconds, the magnitude of the output from the low current driver is about 300 milliamps, and the pulse duration of the low pulsed current is about 35 microseconds. FIG. 2 illustrates the magnitude and duration of the high current pulses 30 and the low current pulses 32, in accordance with embodiments of the invention.

By determining the laser diode junction temperature, over-temperature conditions can be detected and steps can be taken to reduce the junction temperature and thereby prevent damage to the LDA. For example, if processing element 18 determines that the junction temperatures are beyond a predefined normal range, the processing element may direct the high current source 12 to decrease the power, pulsewidth, or frequency of the drive current pulses.

Laser diodes are often mounted on a heatsink (element 24 of FIG. 1). In some cases, the heat from the heatsink is dissipated through convection into the ambient atmosphere. However, in many cases, the laser diode temperature is controlled and its generated heat is transported and dissipated through a "thermal management system" (often simply termed a "cooling system". Examples of a thermal management system include thermal electric coolers, refrigerated circulating liquid, or a closed loop of phase change materials flowing through the laser diode mount. Referring now to FIG. 3, a schematic block diagram of a system 40 for determining a junction temperature of a quasi-continuous-wave (QCW) laser diode is illustrated, in accordance with an alternative embodiment of the invention. In contrast to the system 10 of FIG. 1, the system 40 of FIG. 3 does not use a heatsink but rather uses a mounting plate 26 and a thermal management system 28. As illustrated in FIG. 3, the thermal management system may be controlled by the processing element 18. The processing unit may be able to adjust the thermal management system based on the calculated junction temperature.

Embodiments of the invention produce a temperature profile of the laser diode junction between pulses, which in turn indicates the amount of thermal cycling. This information allows for not only a direct comparison of different LDAs (from different vendors and within a lot from the same vendor) for pre-screening purposes. This information also yields the health and status of the device and allows for estimations of relative lifetime of a device using the Arrhenius relationship (described below). This technique may be used to provide an early detection of possible failure of an LDA to allow preventive measures to avoid laser failure. Extensions of this technique would allow for remote real-time monitoring of LDAs while in operation, thus providing helpful data during on-orbit operation of laser remote sensing systems. Having the ability to accurately measure the junction temperature further enables verification of laser package design features focused on removing heat from the LDA junction. This information may also be used to make trade-off decisions for maximum diode lifetime. These trade-offs may include peak power, pulse width, and pulse repetition rate.

Current LDAs have an electrical to optical efficiency of about 50%. Therefore, when running a typical 6-bar LDA close to full rating, about 600 watts (W) of peak optical power is generated, and an equivalent amount is released in the form of heat. This excess energy, primarily generated in the active area of the bars (light emitting region), is quite substantial. Given that each active area within each bar is typically about 100 microns wide by one millimeter long (a surface area of $10^{-3}$ square centimeters ($cm^2$)), this yields a peak power density of about 1.4 KW/$cm^2$ for a bar with 70% fill factor, which must flow into the heat sink. It is this extreme excess heat, and the rate and efficiency with which it is removed, that drastically affect the laser diode performance, reliability, and lifetime. The level of impact of the long pulse operation may be roughly estimated by an Arrhenius relationship written as: lifetime $(\tau) \propto (T_a - T_b)^{-N} \exp(E_a/kT_a)$, where lifetime $(\tau)$ is expressed as a function of junction temperatures $T_a$ and $T_b$ (measured immediately after and before the generated pulse, respectively), the activation energy ($E_a$), and Boltzmann's constant (k). The leading term accounts for the thermal cycling fatigue due to mismatch of thermal expansion coefficients of different package materials and various layers of the laser bar. The power N in the expression can have a value between 2 and 5, depending on the materials properties based on the Manson-Coffin law for thermal fatigue. It is obvious from this Arrhenius equation that reducing the temperatures before and after the pulse is the key for increasing the lifetime to an acceptable level. This may be achieved through careful selection of the LDA package type, specifications of the array considering the pumping requirements, and defining its operational parameters.

By using the temperature information provided by systems and methods of the present invention, a number of steps can be taken to improve the lifetime of LDAs. Although these considerations will increase the lifetime and reliability of LDAs, an accurate trade analysis between LDA operational and design parameters is required in order to improve lifetime to an acceptably quantifiable level for LDA applications in which LDA lifetime is critical. Such a trade analysis can, with careful consideration of the solid state laser pump requirements and the LDA lifetime objectives, enable optimization of LDA specifications. These specifications include package design (e.g., geometry, architecture, and heatsink materials), bar efficiency and fill factor, number of bars per package and their pitch, operational temperature, and operating parameters such as repetition rate, pulsewidth, and applied current.

One of the main advantages of this technique is its ability to obtain the junction temperature before and after each LDA pump pulse (i.e., high current pulse). Another benefit of this measurement technique is its ability to determine the junction temperature while running the LDA at any operational parameters without tedious post processing required by other techniques, such as time-resolved spectral measurements. LDA temperature measurements made using this technique show that the temperature rise during the pump pulse is almost a linear function of applied current. Using the measured junction temperatures in the Arrhenius expression discussed above, the relative impact of current de-rating can be estimated. It is worth noting that high power quasi-CW or pulsed laser diodes arrays are complex electro-optical components and thus their lifetimes do not follow well defined or known predictable models such as Arrhenius relationships unless considerable statistical data is available for accurately specifying the activation energy (Ea) and thermal fatigue constant (N). However, using the thermal data obtained from FV-SP measurements in an Arrhenius model allows for a reasonable analysis of the LDA performance and determining the optimum operational parameters for achieving the maximum possible LDA lifetime while meeting the solid state laser pump requirements and the mission objectives.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system for determining a junction temperature of a quasi-continuous-wave or pulsed semiconductor laser diode, the system comprising:
   a high current source configured to provide high current drive pulses having an amperage selected to cause the laser diode to lase;
   a low current source connected in parallel with the high current source and configured to provide a series of low current monitor pulses between the pulses of the high current drive pulses, each of the low current monitor pulses having an amperage selected to not cause the laser diode to lase;
   a voltage measuring device configured to measure the voltage across the laser diode during provision of the low current monitor pulses; and
   a processing element configured to calculate the junction temperature of the laser diode based on the measured voltage.

2. The system of claim 1, further comprising:
   a delay generator configured to delay a start of the low current monitor pulses for a predetermined time after each pulse of the high current drive pulses.

3. The system of claim 1, wherein the processing element is further configured to adjust a laser diode thermal management system based on the calculated junction temperature.

4. The system of claim 1, wherein the processing element is further configured to determine if the junction temperature exceeds a predetermined maximum temperature and to cause the high current driver to decrease power, pulsewidth, or frequency of the high current drive pulses in order to achieve a desired decrease in the junction temperature.

5. The system of claim 1, wherein the processing element calculates the junction temperature of the laser diode using equation $I=I_0(\exp(qV/nkT)-1)$ in which I is the pulsed low current, $I_0$ is a saturation current of the laser diode, q is an electrical charge of an electron, V is the measured voltage, n is an emission coefficient, k is Boltzmann's constant, and T is the junction temperature of the laser diode.

6. The system of claim 1, wherein the processing element calculates the junction temperature of the laser diode using a predetermined linear equation, and wherein the predetermined linear equation has been determined by measuring the voltage across the laser diode over a range of low current monitor pulses having different amperages and pulsewidths and over a range of different laser diode temperatures.

7. A method for determining a junction temperature of a quasi-continuous-wave or pulsed semiconductor laser diode, the method comprising:
   providing, by a high current source, high current drive pulses to the laser diode, the high current drive pulses having an amperage selected to cause the laser diode to lase;
   providing, by a low current source connected in parallel with the high current source, a series of low current monitor pulses to the laser diode between the pulses of the pulsed high current, each of the low current monitor pulses having an amperage selected to not cause the laser diode to lase;
   measuring, by a voltage measuring device, the voltage across the laser diode during provision of the low current monitor pulses; and
   calculating, by a processing element, the junction temperature of the laser diode based on the measured voltage.

8. The method of claim 7, further comprising:
   delaying, by a delay generator, a start of the low current monitor pulses for a predetermined time after each pulse of the high current drive pulses.

9. The method of claim 7, further comprising:
   adjusting, by the processing element, a laser diode thermal management system based on the calculated junction temperature.

10. The method of claim 7, further comprising:
    determining, by the processing element, if the junction temperature exceeds a predetermined maximum temperature; and
    causing, by the processing element, the high current source to decrease power, pulsewidth, or frequency of the high current drive pulses in order to achieve a desired decrease in the junction temperature.

11. The method of claim 7, wherein calculating the junction temperature comprises calculating the junction temperature using equation $I=I_0(\exp(qV/nkT)-1)$ in which I is the pulsed low current, $I_0$ is a saturation current of the laser diode, q is an electrical charge of an electron, V is the measured voltage, n is an emission coefficient, k is Boltzmann's constant, and T is the junction temperature of the laser diode.

12. The method of claim 7, wherein calculating the junction temperature comprises calculating the junction temperature using a predetermined linear equation, and wherein the predetermined linear equation has been determined by measuring the voltage across the laser diode over a range of low current monitor pulses having different amperages and pulsewidths and over a range of different laser diode temperatures.

* * * * *

UNITED STATES PATENT AND TRADEMARK OFFICE
CERTIFICATE OF CORRECTION

| | | |
|---|---|---|
| PATENT NO. | : 8,112,243 B2 | |
| APPLICATION NO. | : 12/118172 | |
| DATED | : February 7, 2012 | |
| INVENTOR(S) | : Meadows et al. | |

It is certified that error appears in the above-identified patent and that said Letters Patent is hereby corrected as shown below:

On title page, item 54 Title,
replace "Forward Voltage Short-Pulse Technique for Measuring High Power Laser Array Junction Temperture"
with "Forward Voltage Short-Pulse Technique for Measuring High Power Laser Diode Array Junction Temperature"

Signed and Sealed this
Fifteenth Day of May, 2012

David J. Kappos
*Director of the United States Patent and Trademark Office*

UNITED STATES PATENT AND TRADEMARK OFFICE
CERTIFICATE OF CORRECTION

PATENT NO. : 8,112,243 B2
APPLICATION NO. : 12/118172
DATED : February 7, 2012
INVENTOR(S) : Meadows et al.

Page 1 of 1

It is certified that error appears in the above-identified patent and that said Letters Patent is hereby corrected as shown below:

On title page, item 54 and Column 1, lines 1-4, Title,
replace "Forward Voltage Short-Pulse Technique for Measuring High Power Laser Array Junction Temperture"
with "Forward Voltage Short-Pulse Technique for Measuring High Power Laser Diode Array Junction Temperature"

This certificate supersedes the Certificate of Correction issued May 15, 2012.

Signed and Sealed this
Twelfth Day of June, 2012

David J. Kappos
*Director of the United States Patent and Trademark Office*